| | | | |
|---|---|---|---|
| (12) | United States Patent | (10) Patent No.: | US 8,549,564 B1 |
| | Everson et al. | (45) Date of Patent: | Oct. 1, 2013 |

(54) WIRELESS VIDEO UPLINK SYSTEM THAT WIRELESSLY BROADCASTS A NETWORK ACCESS PROVIDER IDENTIFIER

(75) Inventors: John Michael Everson, Parker, CO (US); Jarrod A. Nichols, Olathe, KS (US); Jason R. Delker, Olathe, KS (US); Bradley Allen Kropf, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 311 days.

(21) Appl. No.: 12/871,595

(22) Filed: Aug. 30, 2010

(51) Int. Cl.
*H04N 7/16* (2011.01)

(52) U.S. Cl.
USPC ............... 725/62; 725/64; 725/65; 725/66; 725/67; 725/68; 725/70; 725/71; 725/80; 725/81; 725/82; 725/85; 455/452.1; 455/451; 455/500; 455/507; 455/524; 455/525

(58) Field of Classification Search
USPC ............... 725/64–68, 70–71, 78, 80–82, 85, 725/62; 455/452.1, 451, 500, 507, 517, 524, 455/525
See application file for complete search history.

(56) References Cited

U.S. PATENT DOCUMENTS

| | | | |
|---|---|---|---|
| 5,794,116 A * | 8/1998 | Matsuda et al. | 725/114 |
| 5,806,005 A | 9/1998 | Hull et al. | |
| 5,915,207 A | 6/1999 | Dao et al. | |
| 5,963,557 A | 10/1999 | Eng | |
| 6,246,430 B1 | 6/2001 | Peters et al. | |
| 6,774,926 B1 | 8/2004 | Ellis et al. | |
| 7,420,956 B2 * | 9/2008 | Karaoguz et al. | 370/338 |
| 7,856,468 B2 | 12/2010 | Yoshimine et al. | |
| 8,064,080 B2 | 11/2011 | Kawai | |
| 8,363,592 B2 * | 1/2013 | Laroia et al. | 370/326 |
| 2002/0038359 A1 | 3/2002 | Ihara et al. | |
| 2002/0184630 A1 * | 12/2002 | Nishizawa et al. | 725/44 |
| 2004/0102202 A1 * | 5/2004 | Kumaran et al. | 455/515 |
| 2005/0060750 A1 * | 3/2005 | Oka et al. | 725/80 |
| 2006/0073795 A1 | 4/2006 | Mayblum et al. | |
| 2006/0130100 A1 | 6/2006 | Pentland | |
| 2006/0136971 A1 * | 6/2006 | Uchida et al. | 725/81 |
| 2007/0016932 A1 * | 1/2007 | Franken et al. | 725/51 |
| 2007/0219686 A1 | 9/2007 | Plante | |
| 2008/0013459 A1 * | 1/2008 | Do et al. | 370/248 |
| 2008/0022329 A1 | 1/2008 | Glad | |
| 2008/0261597 A1 * | 10/2008 | Hayama et al. | 455/436 |
| 2009/0061871 A1 * | 3/2009 | Gross et al. | 455/436 |
| 2009/0137254 A1 * | 5/2009 | Vukovic et al. | 455/452.1 |
| 2009/0189981 A1 | 7/2009 | Siann et al. | |

(Continued)

OTHER PUBLICATIONS

Wimaxxed, "BBC, Telabria Conduct Live News Broadcast Over WiMax," Sep. 28, 2005, 3 pages, www.wimaxxed.com, http://www.wimaxxed.com/wimaxxed_news/20050928/bbc_telabria_c.html.

Primary Examiner — Jason Salce

(57) ABSTRACT

A wireless access system comprises a base station and a control system. The base station wirelessly broadcasts a pilot signal including a network access provider identifier that identifies a wireless video service. The base station wirelessly receives a wireless video uplink request from a wireless video device in response to the pilot signal. The control system processes reservation data for the base station to determine if the wireless video device has a current wireless video uplink reservation and directs the base station to provide a wireless video uplink to the wireless video device if the wireless video device has the current wireless video uplink reservation. The base station wirelessly receives video data from the wireless video device over the wireless video uplink as directed by the control system.

18 Claims, 15 Drawing Sheets

(56) References Cited

U.S. PATENT DOCUMENTS

2009/0191913 A1    7/2009  Jones
2010/0273463 A1*  10/2010  Bonnefoy et al. .......... 455/414.1
2011/0113454 A1*   5/2011  Newell et al. ................... 725/63
2011/0287798 A1*  11/2011  Ono et al. ...................... 455/509

* cited by examiner

WIRELESS UPLINK CONDITION

FEED SHARING REQUIRED WITH POOL # 23

[X] ACCEPT   [ ] REJECT

USER: ▶ JANE DOE

ACCESS URL: ▶ KXYZNEWS.VIDNET.COM

PUBLIC ACCESS: ▶ NO

ACCESS CODE: ▶ NO

ACCESS FEE: ▶ NONE

POOL ID: ▶ 23

DESCRIPTION

KXYZ NEWS, BUILDING FIRE AT INDUSTRIAL PARK, FIREFIGHTERS ON SCENE, APPARENT CHEMICAL EXPLOSION, PERVASIVE BURNING PLASTIC ODOR, NO CASUALTIES REPORTED

DATE: 10/23/15
START TIME: 6:30 AM
STOP TIME: TBD
BASE STATION ID: XYZ123
GPS: 123.456 x 654.321
ORIENTATION: 270 DEGREES (WEST)

FIGURE 10

WIRELESS UPLINK CONDITION

WIRELESS VIDEO UPLINK WILL TERMINATE AT 5:00 PM

☒ ACCEPT   ☐ REJECT

USER: ▶ JOHN DOE

ACCESS URL: ▶ WESTSIDEHS.VIDNET.COM

PUBLIC ACCESS: ▶ YES

ACCESS CODE: ▶ 898989

ACCESS FEE: ▶ $2.00

POOL ID: ▶ NONE

DESCRIPTION

WESTSIDE HIGH SCHOOL v. EASTSIDE HIGH SCHOOL FOOTBALL GAME

DATE: 11/23/15
START TIME: 1:30 PM
STOP TIME: TBD
BASE STATION ID: XYZ321
GPS: 654.321 x 123.456
ORIENTATION: 180 DEGREES (SOUTH)

FIGURE 11

WIRELESS VIDEO UPLINK SYSTEM THAT WIRELESSLY BROADCASTS A NETWORK ACCESS PROVIDER IDENTIFIER

TECHNICAL BACKGROUND

Remote video feeds are routinely used by news organizations and sporting events to share live, high quality video feeds with their primary audiences. Due to the lack of high capacity wired networks at most of these locations, these video feeds are commonly performed over satellite uplinks and less commonly over terrestrial 3G wireless networks. Satellite uplinks require the content organization to deploy a dedicated vehicle with a large antenna, power supply, and high power transmitter. This broadcast truck and associated communications hardware and systems are both cumbersome and expensive. As a result, most broadcast organizations have limited resources and have to deploy them sparingly and at great expense. Terrestrial cellular uplink systems, while technically feasible, often require complex and expensive uplink bonding systems and despite efforts to achieve sufficient bandwidth, often fail to deliver the quality and bandwidth required to transmit broadcast-quality video. Further, if many companies congregate in a news-making location and simultaneously attempt to transmit their broadcast, the end result is a depletion of wireless resources, reducing the ability of any organization to transmit broadcast quality information and the devastation of the resource for all other public users on the network. These terrestrial video uplink systems lack an effective method and technology for reservation of uplink resources, wireless access, user devices, and distribution servers.

Overview

A wireless access system comprises a base station and a control system. The base station wirelessly broadcasts a pilot signal including a network access provider identifier that identifies a wireless video service. The base station wirelessly receives a wireless video uplink request from a wireless video device in response to the pilot signal. The control system processes reservation data for the base station to determine if the wireless video device has a current wireless video uplink reservation and directs the base station to provide a wireless video uplink to the wireless video device if the wireless video device has the current wireless video uplink reservation. The base station wirelessly receives video data from the wireless video device over the wireless video uplink as directed by the control system.

BRIEF DESCRIPTION OF THE DRAWINGS

FIG. 10 illustrates a display provided by the wireless video device.

FIG. 11 illustrates a display provided by the wireless video device.

DETAILED DESCRIPTION

Figure 1:
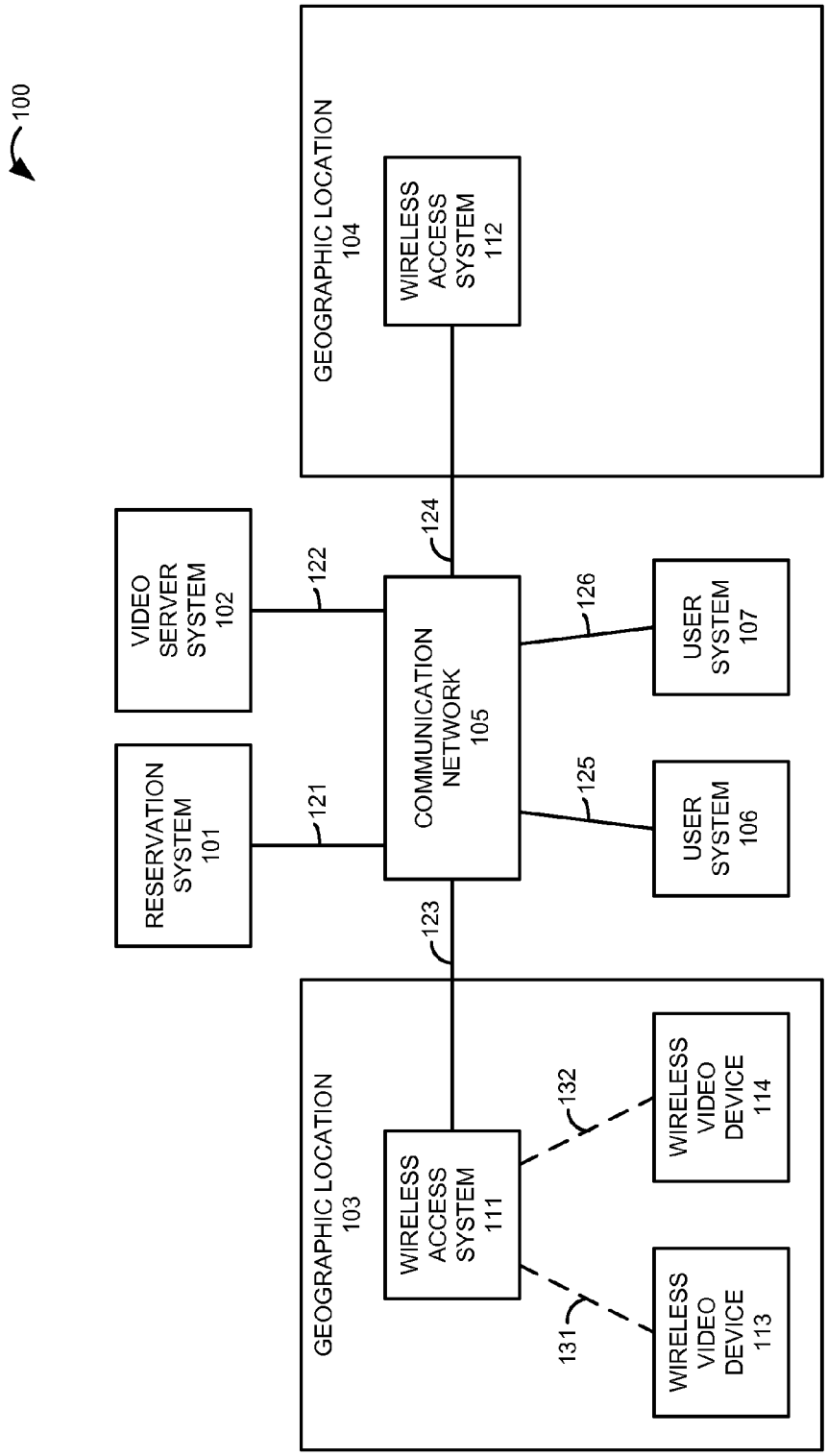
FIG. 1 illustrates a wireless video uplink system including a wireless uplink reservation system.

FIG. 1 illustrates wireless video uplink system 100. Wireless video uplink system 100 comprises reservation system 101, video server system 102, communication network 105, and user systems 106-107. At geographic location 103, wireless video uplink system 100 comprises wireless access system 111 and wireless video devices 113-114. At geographic location 104, wireless video uplink system 100 comprises wireless access system 112.

Reservation system 101 and communication network 105 communicate over communication link 121. Video server system 102 and communication network 105 communicate over communication link 122. User systems 106-107 and communication network 105 communicate over respective communication links 125-126. Wireless access systems 111-112 and communication network 105 communicate over respective communication links 123-124. Wireless video device 113 and wireless access system 111 communicate over wireless link 131. Wireless video device 114 and wireless access system 111 communicate over wireless link 132.

Reservation system 101 and video server system 102 comprise computer and communication systems that include communication transceivers, processing circuitry, memory devices, user interfaces, software, and data. Reservation system 101 and video server system 102 could be integrated together, be discrete systems, or be distributed across various different computer and communication systems.

Communication network 105 comprises communication equipment, such as routers, servers, switches, fiber optic and metallic cabling, and the like. Communication network 105 may be supported by several different service providers and could utilize the public Internet. Communication links 121-126 use metal, glass, air, space, or some other material as the transport media. Communication links 121-126 may use various communication protocols, such as Time Division Multiplex (TDM), Internet Protocol (IP), Ethernet, a wireless protocol, or some other communication format—including combinations thereof. Communication links 121-126 may comprise direct links or may include intermediate networks, systems, or devices.

User system 106 comprises an electronic device that can be operated by a user to interact with reservation system 101 to make wireless video uplink reservations. User system 107 comprises an electronic device that can be operated by a user to request, download, and view video. Examples of user systems 106-107 include computers, phones, televisions, video cameras, game consoles, Internet appliances, and the like.

Wireless access systems 111-112 each comprise communication equipment, such as wireless base stations, gateways, routers, servers, switches, fiber optic and metallic cabling, and the like. The base stations comprise an antenna and RF communication circuitry for wireless communication. The RF communication circuitry typically includes an amplifier, filter, RF modulator, software, and signal processing circuitry that implement a wireless communication protocol. Wireless communication links 131-132 use the air or space as the transport media. Wireless links 131-132 may use various protocols, such as Code Division Multiple Access (CDMA), Global System for Mobile Communications (GSM), Evolution Data Only (EVDO), Worldwide Interoperability for Microwave Access (WIMAX), High Speed Packet Access (HSPA), Long Term Evolution (LTE), or some other wireless communication format—including combinations thereof. Wireless links 131-132 could be direct links or may include intermediate networks, systems, or devices.

Wireless video devices 113-114 include an optical receiver to capture optical signals and generate corresponding video data. Wireless video devices 113-114 include an antenna and RF communication circuitry for wireless communication. The RF communication circuitry typically includes an amplifier, filter, RF modulator, software, and signal processing circuitry that implement a wireless communication protocol. Wireless video devices 113-114 also include a processing system and user interface to execute applications, control video operations, and direct wireless access—in addition to other tasks. In some examples, wireless video devices 113-114 are further configured to make reservations and download video like user systems 106-107. Some examples of wireless video devices 113-114 include high-definition video cameras with wireless communication transceivers, smart phones with cameras, netbooks, and the like.

Figure 2:
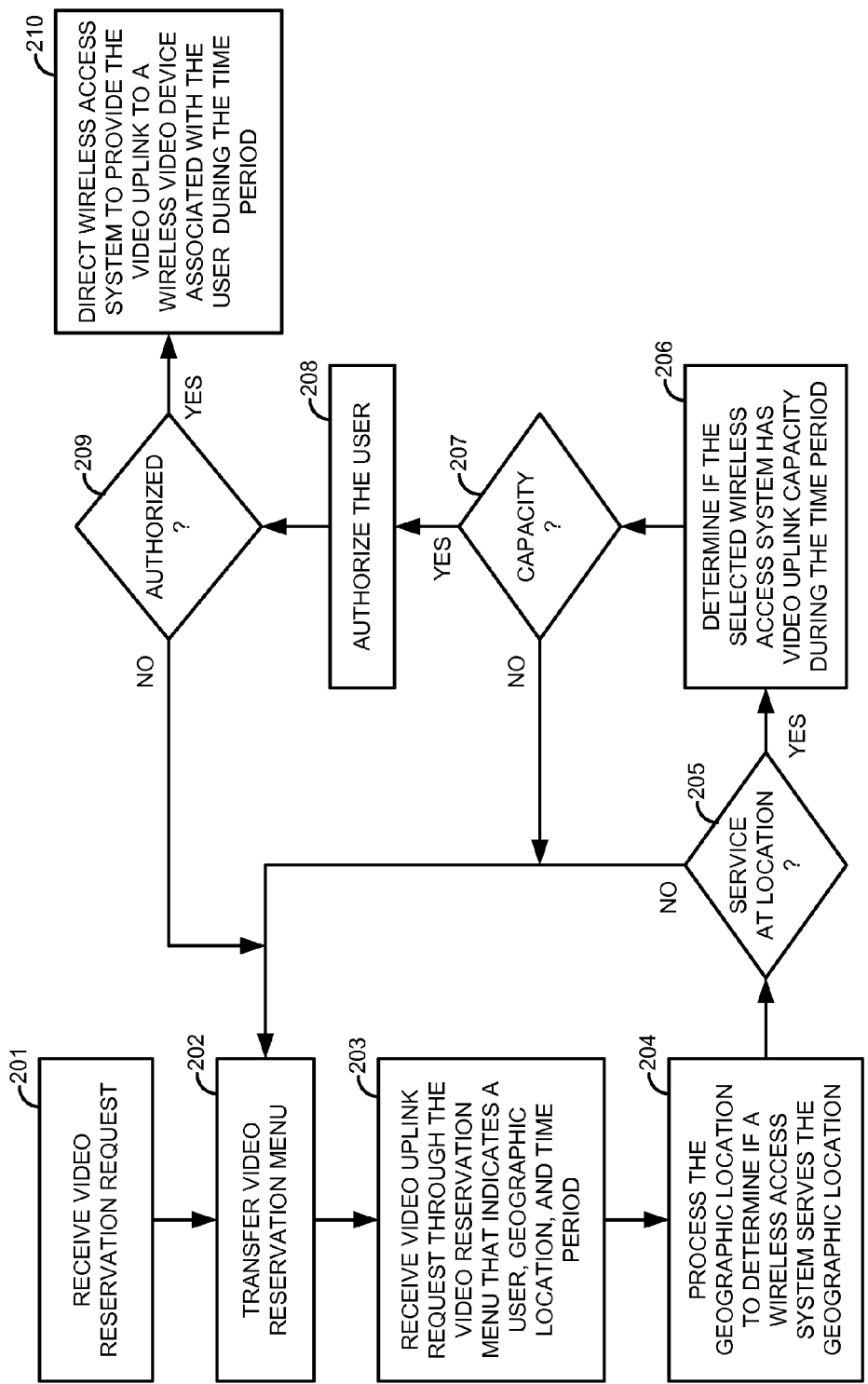
FIG. 2 illustrates the operation of the wireless uplink reservation system.

FIG. 2 illustrates the operation of video uplink reservation system 101. Reservation system 101 receives a video reservation request from user system 106 (201). In response to the reservation request, reservation system 101 transfers a reservation menu to user system 106 (202). For example, user system 106 might log-in to a reservation web-site hosted by reservation system 101 and download the reservation menu.

User system 106 uses the menu to submit a video uplink request that indicates the user, geographic location 103, and a time period. The user could be indicated by a user ID, device ID, group ID, pool ID or some other data associated with the user. The geographic location 103 could be indicated through the selection of a point on a geographic map. The menu and corresponding uplink request may include other data, such as a Uniform Resource Locator (URL) or access code to download the video, permission for public access to the video, or a fee required to access the video.

Reservation system 101 processes the uplink request to determine if a wireless access system serves the geographic location (204). Since wireless access system 111 serves geographic location 103 (205), reservation system 101 determines if wireless access system 111 has available video uplink capacity during the specified time period (206). If wireless access system 111 has available video uplink capacity during the time period (207), then reservation system 101 authorizes the user (208). If the user is authorized (209), then reservation system 101 grants the reservation and directs wireless access system 111 to provide a wireless video uplink during the time period to wireless video device 113—which is associated with the user (210). Reservation system 101 may also transfer the reservation data to server system 102 for use in video distribution.

Referring back to FIG. 1, wireless access system 111 wirelessly receives video data from wireless video device 113 over the reserved video uplink during the time period. Also during the time period, wireless access system 111 inhibits another video uplink attempt from wireless video device 114. The inhibition is designed to maintain adequate uplink capacity for wireless video device 113, and thus, the inhibition could be a complete block or an uplink for device 114 with reduced capacity. Note that this example is illustrative, and more than one video device may simultaneously uplink to the same wireless access system before an uplink inhibition is required to maintain adequate uplink capacity.

Wireless access system 111 transfers the video data to video server system 102 for storage and distribution. User system 107 requests the video data from video server system 102, and in response, video server system 102 transfers the video data to user system 107. For example, user system 107 may log-in to a video web site hosted by video server system 102 to download the video.

Note that multiple wireless devices could be associated with the user. Thus, the reservation could be for a single wireless video device or for a set of wireless video devices—where the first device in the set to use the reserved video uplink gets the reservation and other devices in the set would be inhibited as needed. For example, a news organization may have ten wireless video cameras associated with their user ID. Someone at the news organization could set up the reservation to cover an event, such as a government news conference. The first wireless video camera from the news organization to use the video uplink would get the reservation, and the other nine wireless video cameras might be inhibited if they attempt a wireless video uplink from the news conference site.

In some embodiments, a pooling arrangement may be in effect. In a pooling arrangement, several users agree to share the resulting video from wireless video uplinks. When establishing the reservation, the user would be notified that the pooling arrangement applies, and that other members of the pool will be able to obtain the resulting video from the uplink. In some cases, the wireless video uplink would be awarded on a first-come, first-serve basis, and then the video feed would be shared by all members of the pool.

Figure 3:
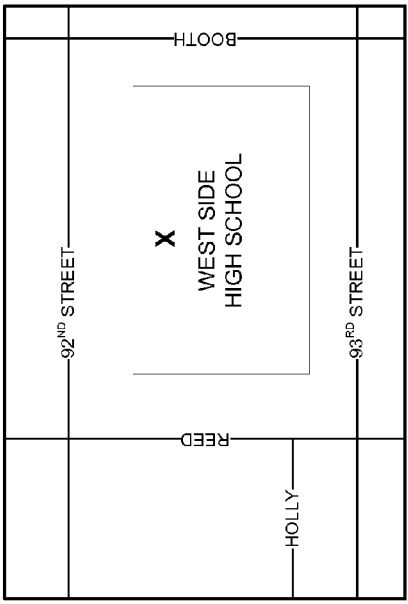
FIG. 3 illustrates a wireless uplink reservation menu.

FIG. 3 illustrates wireless uplink reservation menu 300. Menu 300 is an example of the reservation menu described above, although that reservation menu may take various forms. Wireless uplink reservation menu 300 contains various text boxes to enter information indicating the user, reservation date, location, and the reservation start and stop times. The location may specified by a physical address, intersection, or other suitable description, such as "West Side High School."

A text box is provided to indicate a Uniform Resource Locator (URL) for subsequent distribution—including live streaming. In some cases, the URL has a common hostname to access the video server system, and then the user may specify a path name that typically indicates characteristics of the video. For example, the hostname for the video server system might be "wirelessvideo" and the path name could be "westsidehighbasketball/1-15-15." Thus, the URL might be: www.wirelessvideo/westsidehighbasketball/1-15-15.com.

There is a text box to specify if public access is allowed. Public access may be qualified with a fee, which can be specified in the following boxes. Non-public access requires an access code or the like and may also require a fee. Another text box allows the user to indicate device identifiers, such as Media Access Control (MAC) identifiers, for the wireless video device(s) that may attempt to wirelessly upload video. The next text box allows the user to indicate a pool identifier in the event that the user is associated with a pool.

An additional box is provided for a description of the video, such as a West Side high school basketball game. The description may include significantly more data, and the data may be used as metadata in a search interface for others who search for videos to download. Note that some of this data may be pre-stored for selection using the down arrows in the text boxes. In addition, other interfaces, such as calendars and clocks, may be used to collect user data.

Reservation menu 300 also has a map section that has been simplified for clarity. The map section is typically larger and includes buttons for zooming in and out, as well as, directional movement. The map section also typically includes a search interface, like a text box, to input search terms and focus the map on a desired location. For example, the entry "national mall" might focus the map on the national mall (near the Washington Monument) in the District of Columbia.

Once the user navigates to the desired geographic area on the map, they may then select a location for the wireless video uplink. For example, the user may navigate to West Side high school and then select the school for the uplink. This selection is significant because the reservation system uses this location to identify the serving wireless access system and to check for available uplink capacity during the desired time frame.

A notification area is included to provide feedback to the user. Various forms of feedback may be provided. For example, video uplinks from schools or parks may require public access. In another example, a suggested URL path may not be available. Other information may be presented to the user in a like manner.

Figure 4:
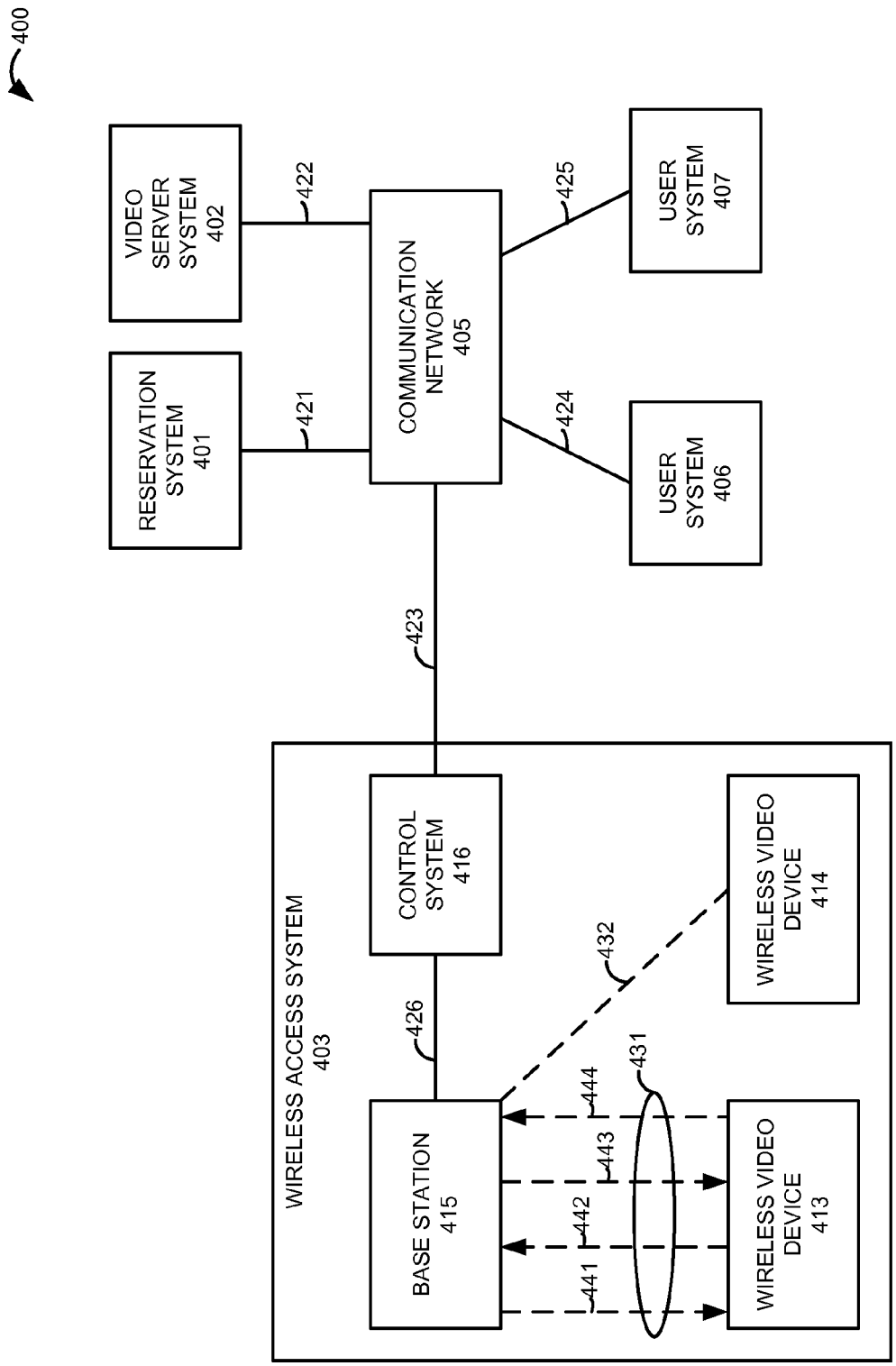
FIG. 4 illustrates a wireless video uplink system including a wireless access system.

FIG. 4 illustrates wireless video uplink system 400. Wireless video uplink system 400 comprises reservation system 401, video server system 402, wireless access system 403, communication network 405, and user systems 406-407. Wireless access system 403 comprises base station 415, control system 416, and wireless video devices 413-414. Wireless access system 403 is an example of wireless access systems 111-112, although systems 111-112 may use alternative configurations.

Reservation system 401 and communication network 405 communicate over communication link 421. Video server system 402 and communication network 405 communicate over communication link 422. User systems 406-407 and communication network 405 communicate over respective communication links 424-425. Control system 416 and communication network 405 communicate over communication link 423. Base station 415 and control system 416 communicate over communication link 426. Wireless video devices 413-414 and base station 415 communicate over wireless communication links 431-432 (where link 431 is represented by signals 441-444).

Reservation system 401 and video server system 402 comprise computer and communication systems that include communication transceivers, processing circuitry, memory devices, user interfaces, software, and data. Reservation system 401 and video server system 402 could be integrated together, be discrete systems, or be distributed across various different computer and communication systems. Communication network 405 comprises communication equipment, such as routers, servers, switches, fiber optic and metallic cabling, and the like. Communication network 405 may be supported by several different service providers and could utilize the public Internet. User system 406 comprises an electronic device that can be operated by a user to interact with reservation system 401 to make wireless video uplink reservations. User system 407 comprises an electronic device that can be operated by a user to request, download, and view video. Examples of user systems 406-407 include computers, phones, televisions, video cameras, game consoles, Internet appliances, and the like.

Wireless video devices 413-414 each include an optical receiver to capture optical signals and generate corresponding video data. Wireless video devices 413-414 include an antenna and RF communication circuitry for wireless communication. The RF communication circuitry typically includes an amplifier, filter, RF modulator, software, and signal processing circuitry that implement a wireless communication protocol. Wireless video devices 413-414 also include a processing system and user interface to execute applications, control video operations, and direct wireless access—in addition to other tasks. In some examples, wireless video devices 413-414 are further configured to make reservations and download video like user systems 406-407. Some examples of wireless video devices 413-414 include high-definition video cameras with wireless communication transceivers, smart phones with cameras, netbooks, and the like.

Base station 415 comprises communication equipment, such as antennas, amplifiers, filters, RF modulators, software, and signal processing circuitry, routers, servers, fiber optic and metallic cabling, and the like. Control system 416 comprises a computer and communication system that includes communication transceivers, processing circuitry, memory devices, user interfaces, software, and data. Control system 416 might include a base station controller, packet network gateway, server, router, border controller, and the like.

Communication links 421-426 use metal, glass, air, space, or some other material as the transport media. Communication links 421-426 may use various communication protocols, such as TDM, IP, Ethernet, a wireless protocol, or some other communication format—including combinations thereof. Communication links 421-426 may comprise direct links or may include intermediate networks, systems, or devices. Wireless communication links 431-432 use the air or space as the transport media. Wireless links 431-432 may use various protocols, such as CDMA, GSM, EVDO, WIMAX, HSPA, LTE, or some other wireless communication format—including combinations thereof. Wireless links 431-432 could be direct links or may include intermediate networks, systems, or devices.

Figure 5:
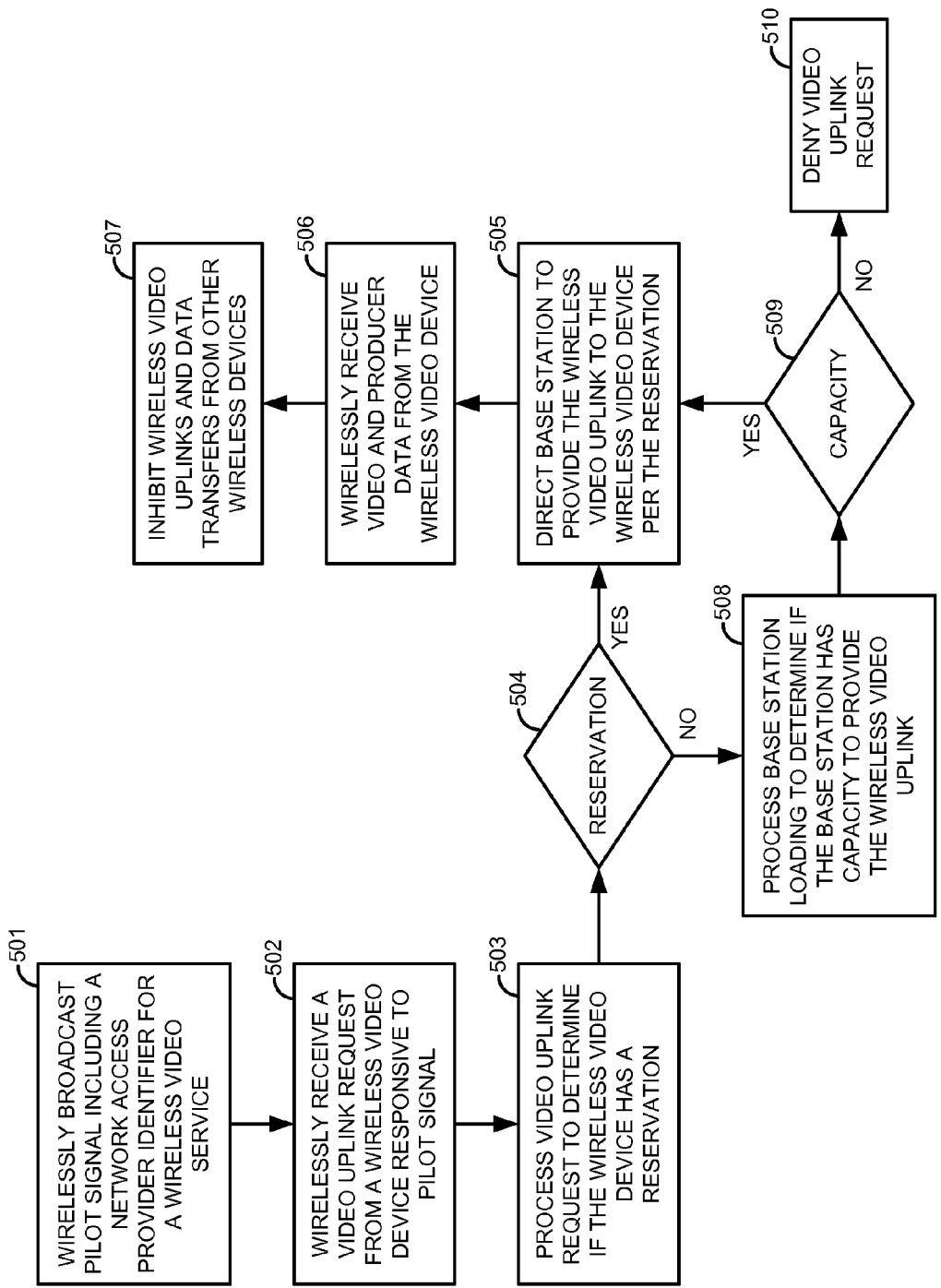
FIG. 5 illustrates the operation of the wireless access system.

FIG. 5 illustrates the operation of wireless access system 403 to support a wireless video uplink service. Prior to the operation on FIG. 5, user system 406 interacts with reservation system 401 to make a video uplink reservation for wireless video device 413 at a geographic location served by base station 415—perhaps as described above. As a result, reservation system 401 provides the associated reservation data to control system 416 in wireless access system 403.

Base station 415 wirelessly broadcasts a pilot signal 441 including a network access provider identifier that identifies the wireless video service (501). Wireless video device 413 wirelessly scans for pilot signal 441 having the network access provider for the wireless video service. The wireless scan entails receiving energy from the air through an antenna and processing the energy at a specific frequency band to detect the network access provider identifier. In response to detecting pilot signal 441, wireless video device 413 wirelessly transfers wireless video uplink request 442. Base station 415 receives wireless video uplink request 442 (502). In response to wireless video uplink request 442, control system 416 processes the reservation data to determine if wireless video device 413 has a current wireless video uplink reservation (503).

Since wireless video device 413 does have a reservation (504), control system 416 directs base station 415 to transfer an indication 443 that the reserved wireless video uplink is available to wireless video device 413. In response, wireless video device 413 captures video and transfers wireless video data 444 to base station 415. Base station 415 receives wireless video data 444 (506) and forwards the video data to control system 416. Control system 416 transfers the video data to video server system 402 for storage and distribution.

If wireless video device 413 did not have a reservation (504), then control system 416 would process loading conditions to determine if base station 415 had the capacity to provide the video uplink to video device 413 (508). If base station 415 has the capacity (509), then control system 416 would direct base station 415 to provide the requested wireless video uplink to video device 413 (505). If base station 415 does not have the capacity (509), then control system 416 would direct base station 415 to deny the video uplink request from video device 413 (510).

Contemporaneously with the video uplink for device 413, wireless video device 414 also requests a wireless video uplink through base station 415. In some examples, this request is placed before the reservation time period for device 413, so the request is temporarily granted. However, during the reservation time period for wireless video device 413, base station 415 inhibits the video uplink or other data transfers from video device 414 to preserve service quality for wireless video device 413 (507).

Thus, wireless access system 403 supports both reserved and non-reserved wireless video uplinks. Wireless access system 403 may also support non-video data transfers, such as voice calls, emails, web surfing, texting, and the like. Control system 416 gives top priority to any reserved video uplinks, and control system 416 inhibits other video and data transfers as needed to provide sufficient quality-of-service to the reserved video uplinks. When capacity permits, control system 416 allows on-demand (not reserved) wireless video uplinks, and control system 416 inhibits other data transfers as needed to provide sufficient quality-of-service to the non-reserved video uplinks. If capacity permits, control system 416 allows other data transfers until subsequent wireless video uplinks require the capacity. In some examples, a predetermined amount of capacity is reserved for video uplinks and the remaining capacity is allocated to data transfers. If the predetermined amount is unused, the techniques described herein may be used to re-allocate nay excess video capacity to other uses.

Figure 6:
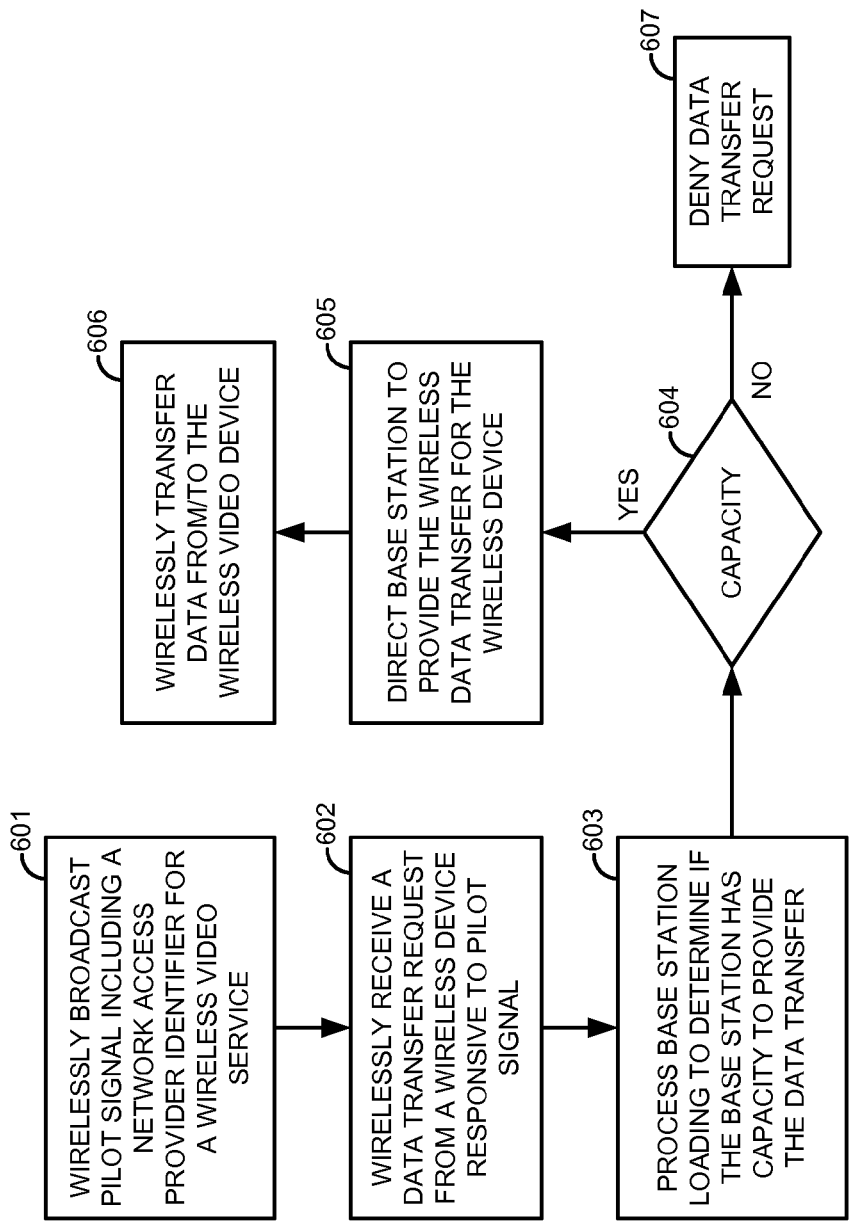
FIG. 6 illustrates the operation of the wireless access system.

FIG. 6 illustrates the operation of wireless access system 403 to support a wireless video service and a data transfer service. The data transfer service could be voice calls, emails, web surfing, texting, and the like. Base station 415 wirelessly broadcasts pilot signal 441 including a network access provider identifier that identifies the wireless video service (601). A wireless data device (not shown) wirelessly scans for pilot signal 441 having the network access provider for the wireless video service. In response to detecting pilot signal 441, the wireless data device wirelessly transfers wireless data transfer request (not a video uplink request). Base station 415 receives the wireless data transfer request (602). In response to wireless data transfer request 442, control system 416 processes loading data to determine if base station 415 has the capacity to provide the wireless data transfer to the wireless data device (603). This processing could entail checking for any imminent reservations, current video uplinks, and current data transfers. If base station 415 has the capacity (604), then control system 415 would direct base station 415 to provide the requested wireless data transfer to the wireless data device (605). Base station 415 and the wireless data device would then wirelessly exchange the data (606). If base station 415 does not have the capacity (604), then control system 416 would direct base station 415 to deny the wireless data transfer request from the wireless data device (607).

Figure 7:
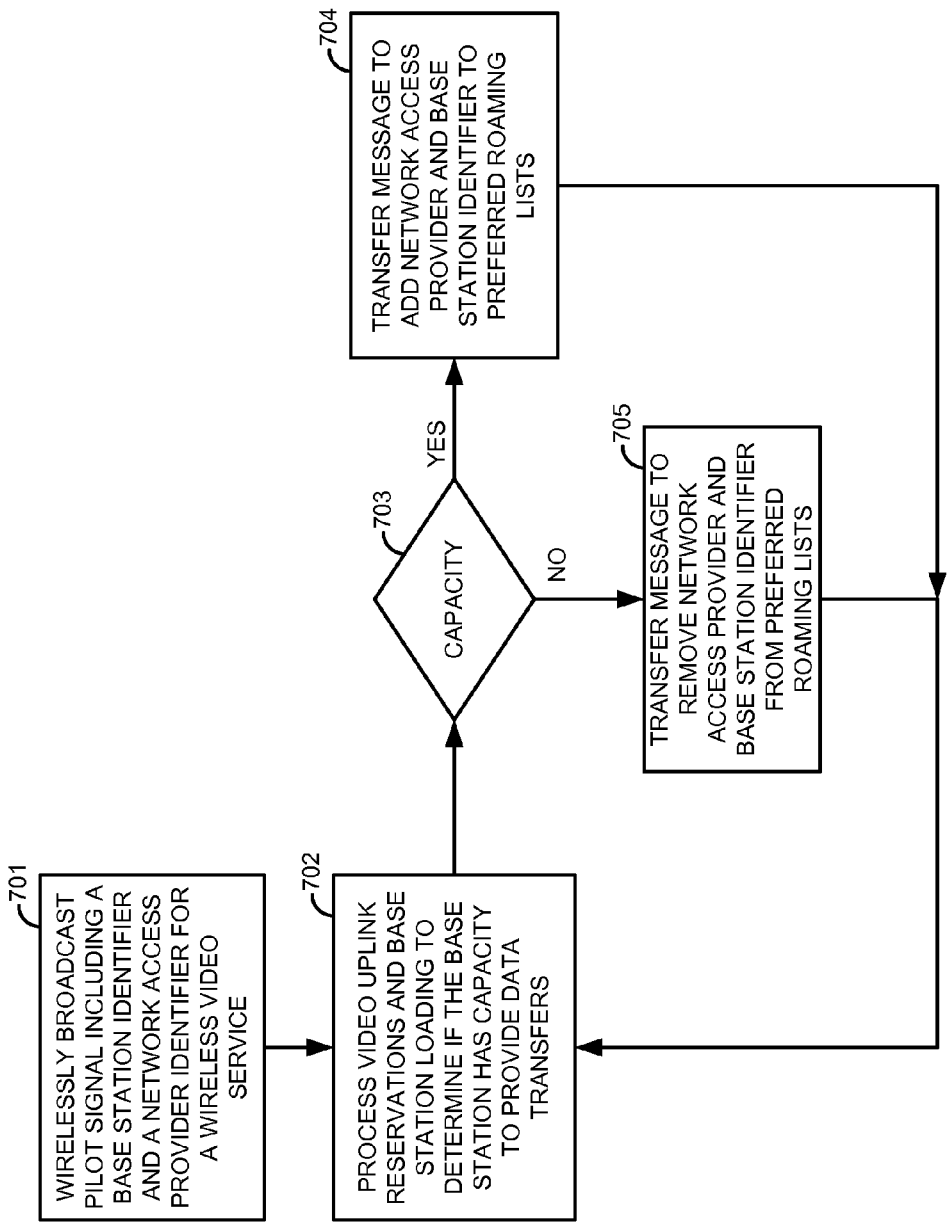
FIG. 7 illustrates the operation of the wireless access system.

FIG. 7 further illustrates the operation of wireless access system 403 to support a wireless video service and a data transfer service. Base station 415 wirelessly broadcasts pilot signal 441 including a network access provider identifier that identifies the wireless video service and a base station identifier (701). Control system 416 processes video uplink reservation data and current base station loading to determine if base station 415 has enough excess capacity to support data transfers (as opposed to video uplinks). If base station 415 has excess capacity (703), then control system 416 transfers a message to add the network access provider and base station identifier to the preferred roaming lists of wireless devices in the geographic area (704). If base station 415 does not have excess capacity (703), then control system 416 transfers a message to remove the network access provider and base station identifier from the preferred roaming lists of devices in the geographic area (705).

Thus, wireless access system 403 supports the wireless video uplink service by broadcasting a dedicated network access provider identifier that can be used by wireless video devices to acquire the video uplink service. Wireless video uplink reservations are accepted and given top priority, even if non-reserved video uplinks or other data transfers must be inhibited (although some system capacity may be reserved for the other data transfers as a top priority). On-demand wireless video uplinks are provided through acquisition of the pilot signal as capacity permits. If excess video uplink capacity exists, then the corresponding base station is added to preferred roaming lists to attract other wireless data users on a temporary or overflow basis.

Figure 8:
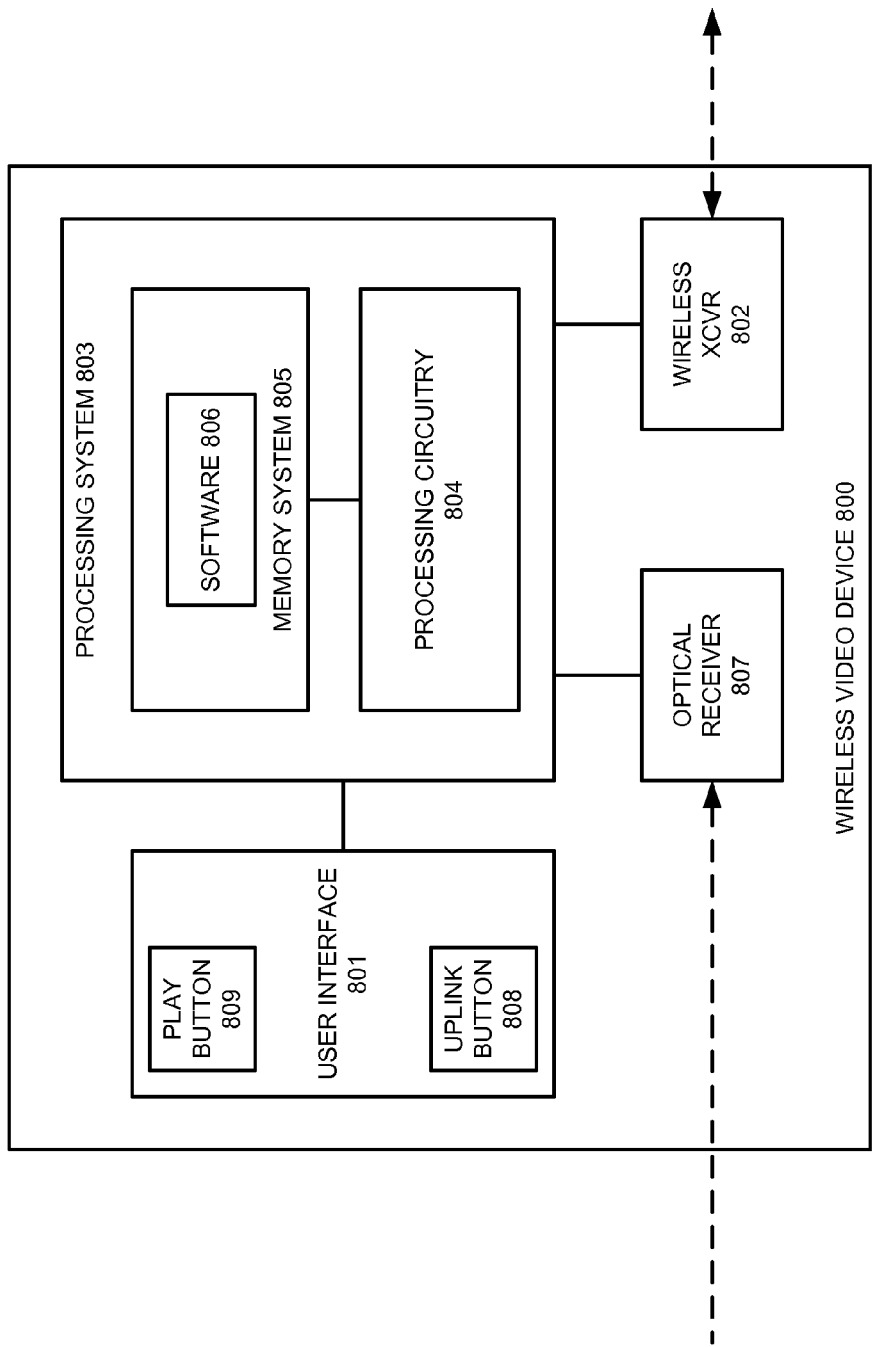
FIG. 8 illustrates a wireless video device.

FIG. 8 illustrates wireless video device 800. Wireless video device 800 is an example of wireless video devices 113-114 and 413-414, although devices 113-114 and 413-414 may use alternative configurations. In addition, wireless video device 800 is an example of user systems 106-107 and 406-407, although systems 106-107 and 406-407 may use alternative configurations.

Wireless video device 800 comprises user interface 801, wireless transceiver 802, processing system 803, and optical receiver 807. Processing system 803 comprises processing circuitry 804 and memory system 805 that stores operating software 806. Processing system 803 is linked to user interface 801, wireless transceiver 802, and optical receiver 807. Wireless video device 800 may include other well-known components that are not shown for clarity, such as an additional communication interface, enclosure, device, power supply, and the like.

User interface 801 includes video uplink button 808 and a video playback button 809. Video uplink and playback buttons 808-809 could be discrete physical keys on the surface of wireless video device 800 or could be selections on a touch-screen display. In some examples, a single activation of video uplink button 808 contemporaneously initiates both the video reception/processing and the video uplink. Thus, the typical "record" button may be omitted from user interface 801 altogether.

User interface 801 also comprises other components that interact with the user, such as graphic displays, keys, buttons, touch-pads, speaker, microphone, and the like. The user operates user interface 801 to capture video, interact with a wireless communication network to upload the video, playback video, and interact with a video server system to store and distribute the video. In some examples, the user may operate user interface 801 to make wireless video uplink reservations.

Wireless transceiver 802 comprises an antenna, filter, amplifier, signal processing circuitry, software, and/or some other communication components. Wireless transceiver 802 may use various wireless communication formats, such as CDMA, GSM, EVDO, WIMAX, HSPA, LTE, or some other wireless communication format—including combinations thereof. Wireless transceiver 802 transmits and receives wireless signals to upload video, interact with the video server system to store and distribute the video, and possibly to make wireless video uplink reservations.

Optical receiver 807 comprises an optical sensor and signal processing circuitry that collects optical signals and generates corresponding digital data (video data). Optical receiver 807 could be a high-definition video camera or some other video collection device. In some example, optical receiver 807 operates in response to the activation of video uplink button 808.

Processing circuitry 804 comprises microprocessor and other circuitry that retrieves and executes operating software 806 from memory system 805. Memory system 805 comprises a computer-readable storage medium, such as a disk drive, flash drive, data storage circuitry, or some other memory apparatus. Memory system 805 could be a single device or be distributed across multiple devices. Processing circuitry 804 is typically mounted on one or more circuit boards that may also hold memory system 805 and portions of user interface 801, wireless transceiver 802, and optical receiver 807.

Operating software 806 comprises computer programs, firmware, or some other form of computer-readable processing instructions. Operating software 806 includes applications as described herein, and may also include an operating system, utilities, drivers, network interfaces, or some other type of software. For example, operating software 806 might include: 1) an operating system module to interface with a user interface, processing circuitry and memory; 2) a video collection module to control an optical receiver; 3) a wireless module to direct wireless communications with a wireless access system, an Internet module to communicate with networked systems, and 4) a video module to interact with video reservation and server systems. Thus, when executed by processing circuitry 804, operating software 806 directs processing system 803 to operate wireless video device 800 to collect and upload video data, and to interact with video reservation and server systems as described herein.

Figure 9:
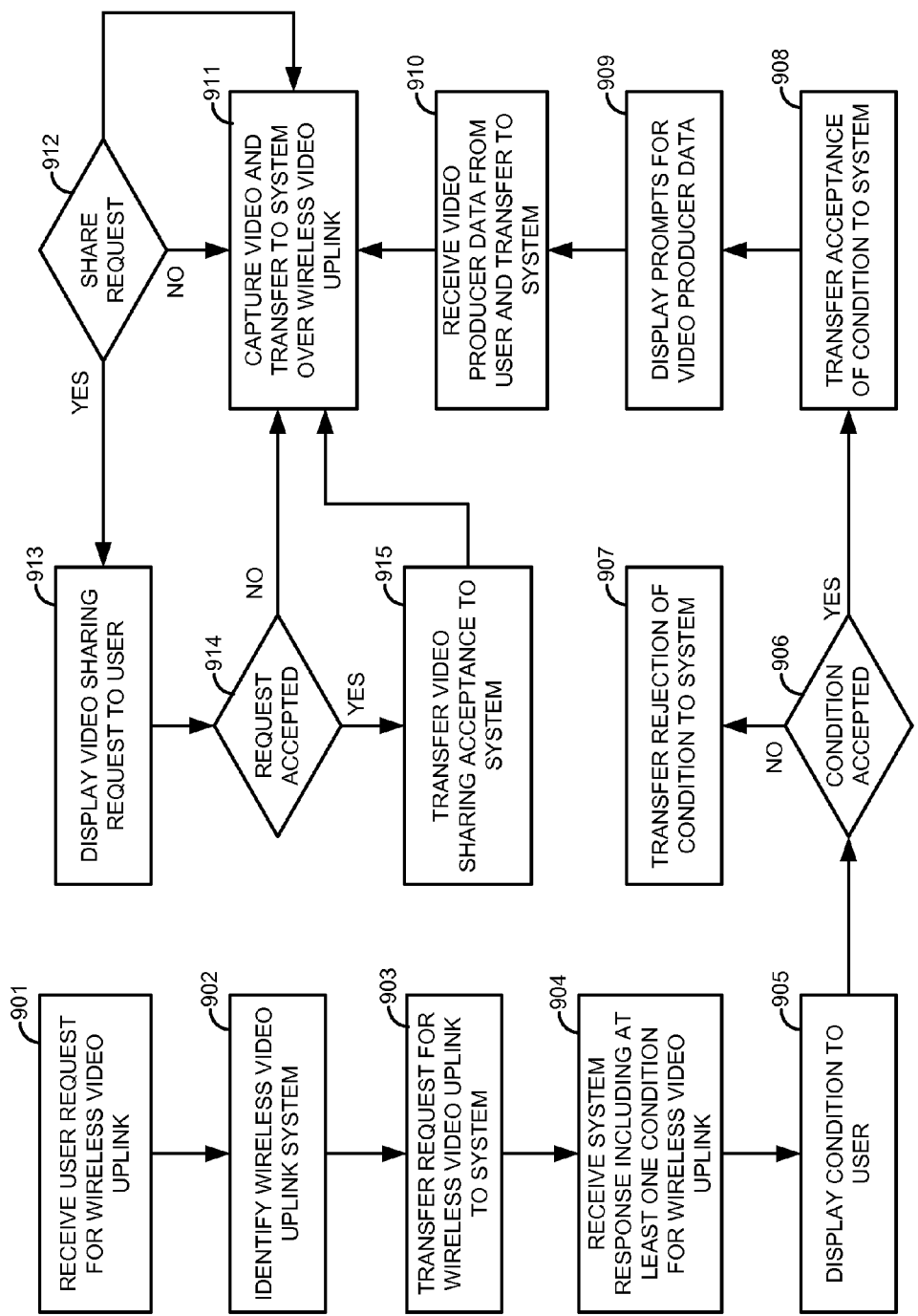
FIG. 9 illustrates the operation of the wireless video device.

FIG. 9 illustrates the operation of wireless video device 800. The user operates video uplink button 808 on device 800 to request a wireless video uplink (901). In response to the user request, wireless video device 800 identifies a wireless video uplink system (902). For example, wireless video device 800 may wirelessly scan for a pilot signal from a communication network able to supply the wireless video uplink. In some cases, the pilot signal carries a network access provider identification for a video uplink service. Wireless video device 800 wirelessly transfers a video uplink request to the identified communication system (903). For example, wireless video device 800 may wirelessly communicate with the identified system to complete system acquisition, perform authentication and authorization with the system, and request a wireless video uplink from the system.

Although not required in all examples, wireless video device 800 may begin to receive and process optical signals to generate video data in response to the activation of uplink button 808. In these examples, video reception could start immediately when button 808 is activated, and the video data would be stored for subsequent transfer over the uplink when it becomes available.

Wireless video device 800 wirelessly receives a system response, and although not required for all such responses, the received system response indicates at least one condition that must be accepted by the user before the wireless video uplink is provided. Wireless video device 800 displays the condition to the user and prompts for user acceptance of the condition (905). The condition could be displayed on a touch screen with corresponding "ACCEPT" and "REJECT" selection buttons. For example, the condition could require public access to the video—typically based on the location of device 800 or a pool to which device 800 belongs. In other cases, the condition might be a time frame when the uplink will be available—such as a length of time before another reservation begins.

If the user rejects the condition (906), wireless video device 800 wirelessly transfers a rejection of the condition and the video uplink is not provided (907). If the user accepts the condition (906), then wireless video device 800 wirelessly transfers an acceptance of the condition (908). Wireless video device 800 then displays prompts for video producer data (909). The video producer data and corresponding display may be similar to that of FIG. 3. Thus, the user may specify a user name, distribution URL, public availability, access code, access fee amount, MAC ID, pool ID, and a description of the video. Note that this video producer data may be used as metadata in a search interface for others who search for videos to download. Also note that wireless communication device 800 may pre-store or supply some of the data including user name, URL, geographic location, date and time, MAC ID, pool ID, and the base station ID for the base station that provides the uplink.

Wireless video device 800 receives video producer data from the user and wirelessly transfers the data to the video server system (910). Wireless video device 800 then captures optical signals, generates corresponding video data, and wirelessly transfers the video data over the video uplink for delivery to the video server system (911), where the video server system distributes the video per the video producer data, reservation data, and any accepted conditions.

During the video upload, wireless video device 800 may receive a request from the video system to share the video data (912) with a second user. For example, the second user at the location may have their video uplink request denied due to uplink capacity restrictions. Based on a site requirement, user instruction, or other parameter, the video system may automatically request video sharing. If the share request is received (912), then wireless video device 800 displays the share request to the user (913). The share request could be displayed on a touch screen with corresponding "ACCEPT" and "REJECT" selection buttons. If the user does not accept the share request (914), then the video upload proceeds as before (911). If the user does accept the share request (914), then wireless video device 800 wirelessly transfers the acceptance to the video system, and the video upload proceeds (911) with the second user sharing the video. In some cases, the shared video data is copied to the second users video distribution server account for distribution in accord with the second user's specifications for public access, fees, and the like.

Note that in the above example, wireless video device 800 uses the on-demand approach to obtain the wireless video uplink. Alternatively, wireless video device 800 could also be operated to invoke a prior video uplink reservation. In this case, the acceptance of conditions (if any) and the provision of user instructions could occur during the reservation process, when invoking the wireless video uplink, or during both activities.

FIG. 10 illustrates display 1000 that is provided by user interface 801 of wireless video device 800 as described above. Note the displayed uplink condition, "feed sharing with pool #23" along side accept and reject selection boxes. The user has accepted the condition by selecting the accept box. Also note the other user instructions and data that is displayed. The user has input a user name, URL to access the video, public access rejection, pool ID, and video description. Wireless video device 800 has added a video date, start time, base station ID for the serving base station, current GPS coordinates where the video is being captured, and the orientation of the video shot by compass direction. Wireless video device 800 transfers these instructions and data to the video control system.

FIG. 11 illustrates display 1100 that is provided by user interface 801 of wireless video device 800 as described above. Note the displayed uplink condition, "wireless video uplink will terminate at 5:00 PM" along side accept and reject selection boxes. The user has accepted the condition by selecting the accept box. Also note the video producer data that is displayed. The user has input a user name, URL to access the video, public access acceptance, access code, access fee, and video description. Wireless video device 800 has added a video date, start time, base station ID for the serving base station, current GPS coordinates where the video is being captured, and the orientation of the video shot by compass direction. Wireless video device 800 transfers the video producer data to the video control system.

Figure 12:
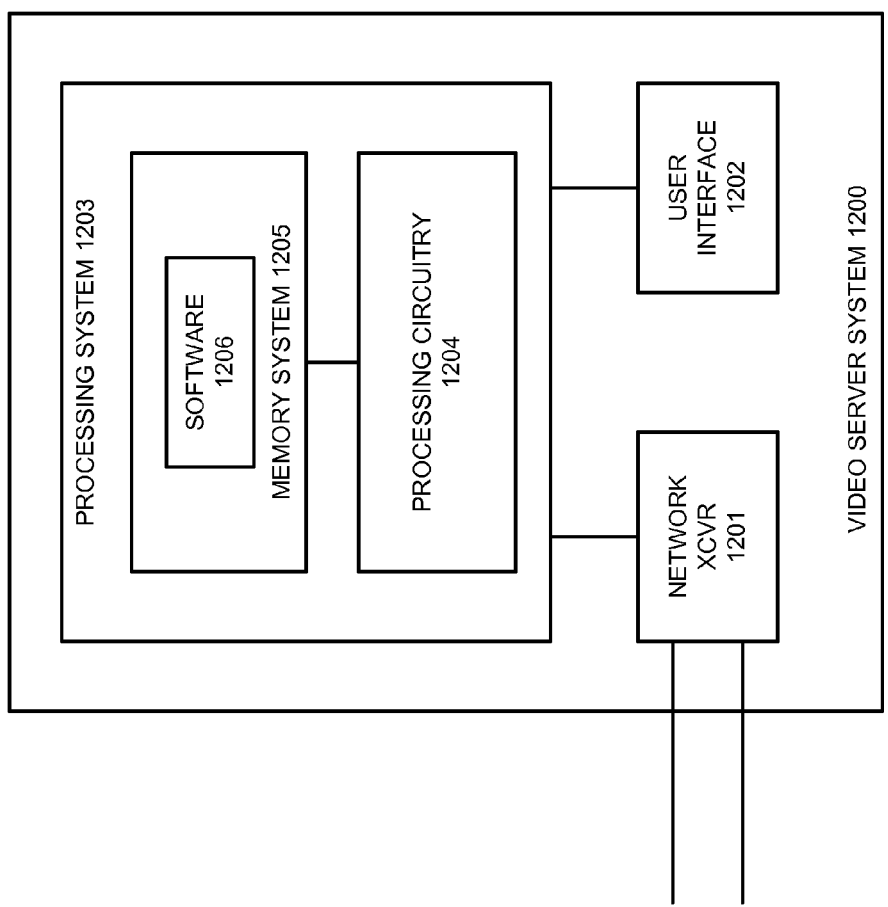
FIG. 12 illustrates a video server system.

FIG. 12 illustrates video server system 1200. Video server system 1200 provides an example of video server systems 102 and 402, although systems 102 and 402 may use alternative configurations. Video server system 1200 could be a discrete system, a distributed system, and/or could be integrated into other systems. In some examples, video server system 1200 includes a wireless video uplink reservation system as described herein.

Video server system 1200 comprises network transceivers 1201, user interface 1202, and processing system 1203. Processing system 1203 comprises processing circuitry 1204 and memory system 1205 that stores operating software 1206. Processing system 1203 is linked to transceiver 1201 and user interface 1202. Video server system 1200 may include other well-known components that are not shown for clarity, such as an additional communication interface, routers, servers, processors, power supply, and the like.

Network transceiver 1201 is coupled to network communication links that may access the Internet or some other communication network. Network transceivers 1201 comprise communication ports, signal processing circuitry, software, and/or some other communication components. Network transceiver 1201 may include an antenna and Radio Frequency (RF) circuitry if wireless communication is used. Network transceiver 1201 may use various communication protocols, such as time division multiplex, internet, Ethernet, CDMA, wireless, or some other communication format— including combinations thereof. Network transceiver 1201 receives videos, video producer data, video reservation data, and video requests. Network transceiver 1201 also transfers the videos for delivery to requesting users.

User interface 1202 comprises other components that interact with operational personnel, such as graphic displays, keys, buttons, touch-pads, and the like.

Processing circuitry 1204 comprises microprocessor and other circuitry that retrieves and executes operating software 1206 from memory system 1205. Memory system 1205 comprises a computer-readable storage medium, such as a disk drive, flash drive, data storage circuitry, or some other memory apparatus. Memory system 1205 could be a single device or be distributed across multiple devices. Processing circuitry 1204 is typically mounted on one or more circuit boards that may also hold memory system 1205 and portions of transceiver 1201 and user interface 1202.

Operating software 1206 comprises computer programs, firmware, or some other form of computer-readable processing instructions. Operating software 1206 may include an operating system, utilities, drivers, network interfaces, applications, or some other type of software. For example, operating software 1206 might include: 1) an operating system module to interface with the user interface, processing circuitry, and memory; 2) a networking module to direct communications, such as Internet sessions; 3) a video reception module to receive, process, and store videos and associated data; 4) a video distribution module to receive video requests and transfer videos, and 5) a reservation module to handle uplink reservations. Thus, when executed by processing circuitry 1204, operating software 1206 directs processing system 1203 to operate video server system 1200 as described herein.

Figure 13:
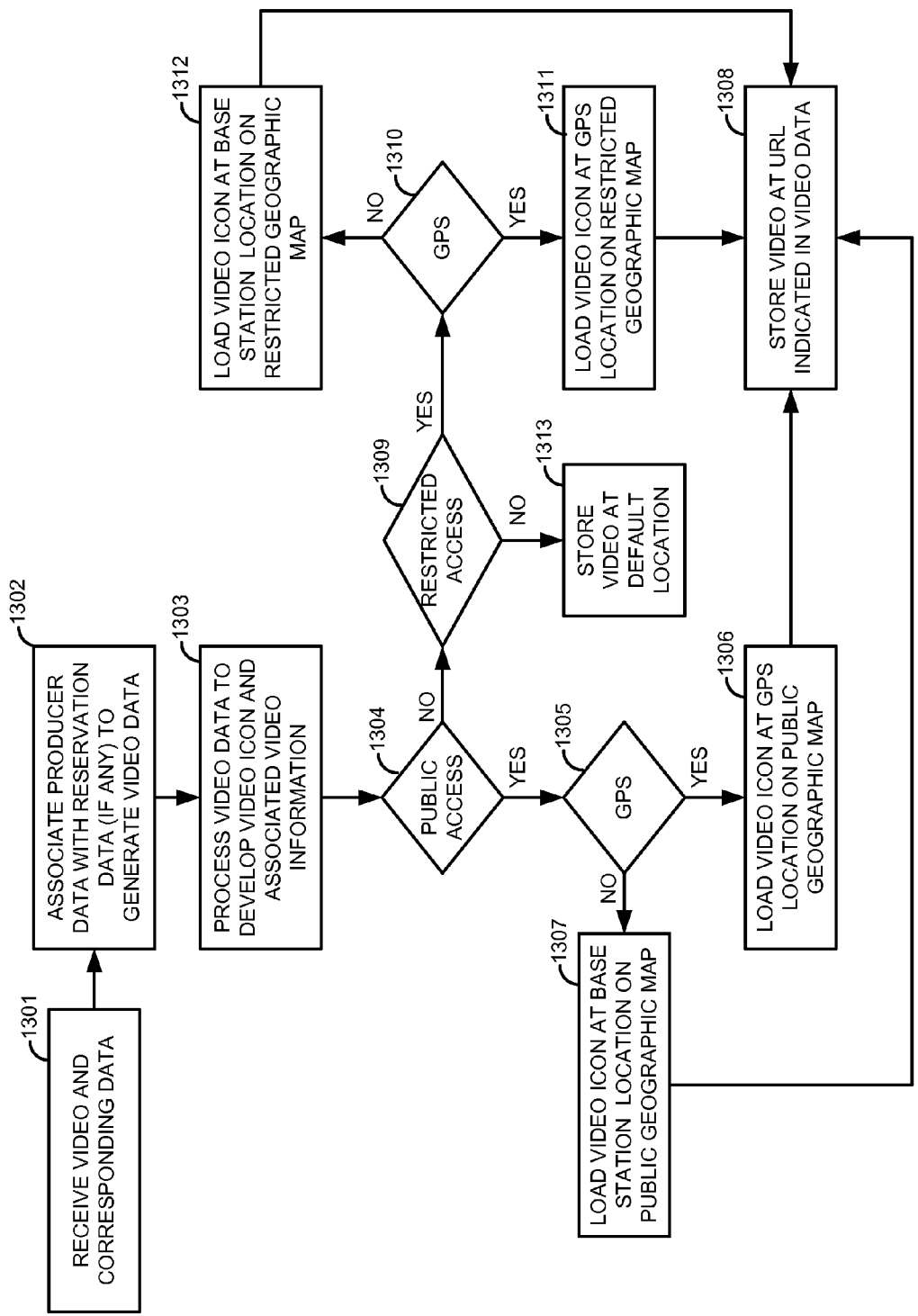
FIG. 13 illustrates the operation of the video server system.

FIG. 13 illustrates the operation of video server system 1200 to process incoming videos. Video server system 1200 receives a video and its corresponding data (1301). The video was uploaded to a base station over a wireless video uplink. The corresponding data includes video producer data that was uploaded along with the video. The corresponding data may also include reservation data for the video from a wireless video uplink reservation system. Video server system 1200 associates the reservation data with its corresponding video by matching the reservation data with the video producer data (1302). For example, the reservation data and the video producer data share the same producer (user name), location, time and date, uplink base station, and typically other data. In addition, video server system 1200 associates the incoming video with other user accounts that may distribute the video through pooling or sharing conditions.

Video server system 1200 processes the video and its corresponding data to develop a video icon and associated video information (1303). Typically, the icon will be placed on a map where hovering over the icon reveals the video information and selecting the icon begins the video download process. The video information includes information regarding the video title, description, producer, time/date, location, public access, access codes, access fees, pools, and the like. Video server system 1200 processes the video information to determine if the video is available to the public (1304). If public distribution is available (1304), then video server system 1200 processes the video information to determine if GPS coordinates for the public video are available (1305). The GPS coordinates may be available from the reservation data or the producer data. If GPS coordinates are available (1305), then video server system 1200 loads the video icon onto a public-access geographic map at the GPS coordinates (1306).

If GPS coordinates are not available (1305), then video server system 1200 loads the video icon onto the public-access geographic map at the location of the base station that provides the uplink (1307). The base station ID may be available from the reservation data or the producer data, and video server system 1200 translates the base station ID into GPS coordinates for the base station. In some examples, a base station sector is identified, and the GPS coordinates are for the base station sector. After loading the icon (1306, 1307), video server system 1200 stores the public video for distribution using the URL listed in the video data (1308).

If the video is not publicly available (1304), then video server system 1200 determines if restricted access to the video is available (1309). Typically, restricted access requires the video requester to provide an access code, biometrics, or some other private key to access the video. If restricted access to the video is available (1309), then video server system 1200 processes the video information to determine if GPS coordinates for the restricted video are available (1310). If GPS coordinates are available (1310), then video server system 1200 loads the video icon onto a restricted-access geographic map at the GPS coordinates (1311). If GPS coordinates are not available (1310), then video server system 1200 loads the video icon onto the restricted-access geographic map near the location of the base station that provided the uplink (1311). After loading the icon (1311, 1312), video server system 1200 stores the video for restricted distribution at the URL listed in the video data (1308).

Note that there would typically be several restricted-access geographic maps that are each customized with the set of video icons for a given producer, URL, user, access code, pool, and the like. If neither public access (1304) nor restricted access (1309) access to the video is available, then video server system 1200 stores the video at a default location for the user (1313).

Note that various types of additional data may be collected. For example, the downloading of public videos may require the requester to provide an email address or other data.

Also note that an entire video server system may be restricted and require the receipt of proper credentials before access is provided. For example, a video server system may be configured to operate as described herein, except that the system would require a registration and authorization procedure to be performed through a front-end portion of the system before any access to the video server is allowed.

Figure 14:
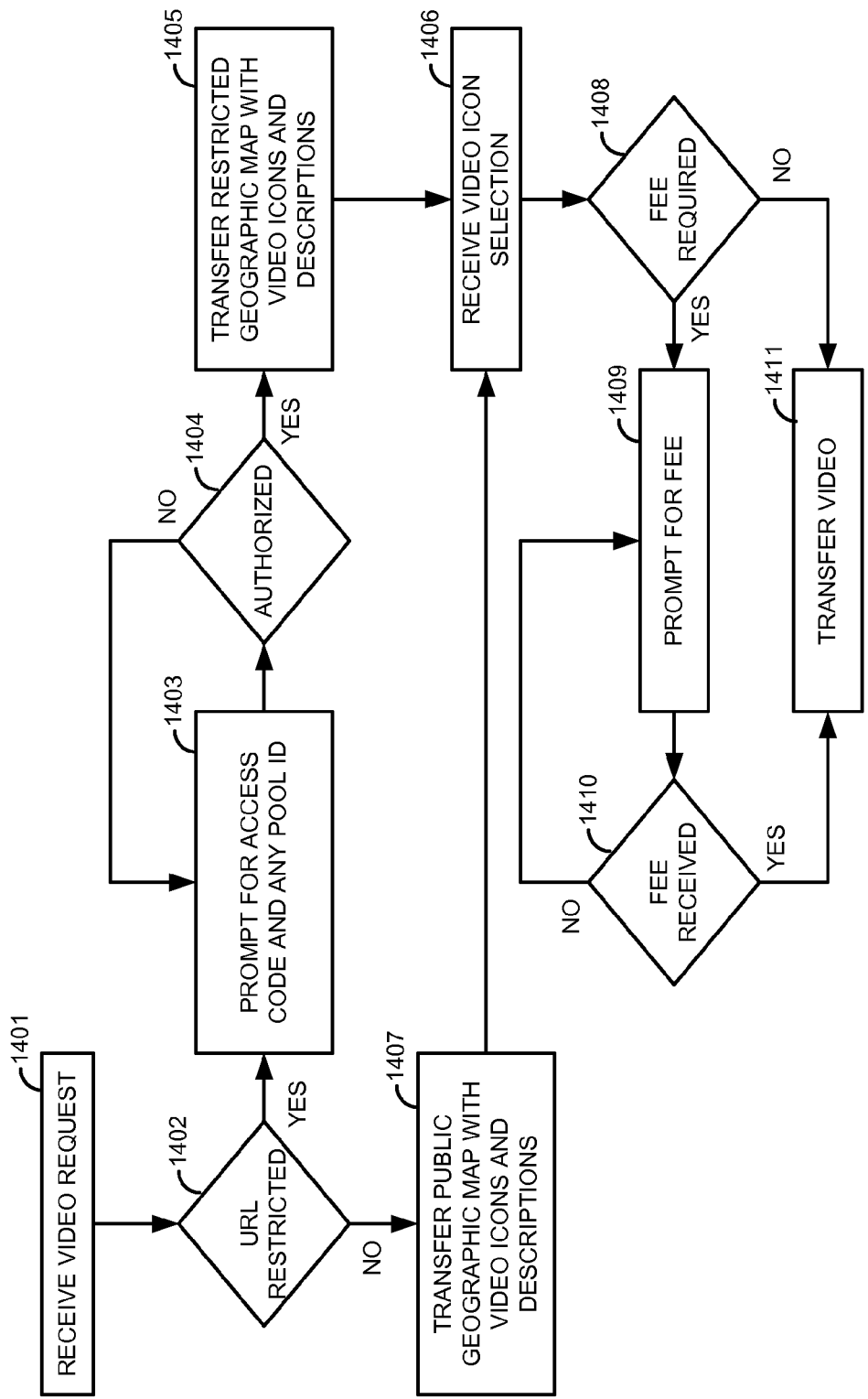
FIG. 14 illustrates the operation of the video server system.

FIG. 14 illustrates the operation of video server system 1200 to serve video requests. Video server system 1200 receives a video request in the form of a URL request. Video server system 1200 determines if the URL from the request is restricted (1402). If the URL is restricted (1402), then video server system 1200 prompts the requester for an access code, pool ID, and the like—including combinations thereof. Video server system 1200 processes the requester's response to determine if the requester is authorized (1404). If the requester is authorized (1404), then video server system 1200 transfers the associated restricted geographic map with video icons and video data (1405). If the URL is not restricted (1402), then video server system 1200 transfers the public geographic map with video icons and video data (1407).

Video server system 1200 receives an icon selection for a video (1406) and determines if any access fee is required for the video (1408). If a fee is required, video server system 1200 prompts the video requester for the fee (1409). If the fee is received (1410), video server system 1200 transfers the video to the video requester (1411). If no fee is required (1408), video server system 1200, transfers the video to the video requester (1411) responsive to the icon selection (1406).

Figure 15:
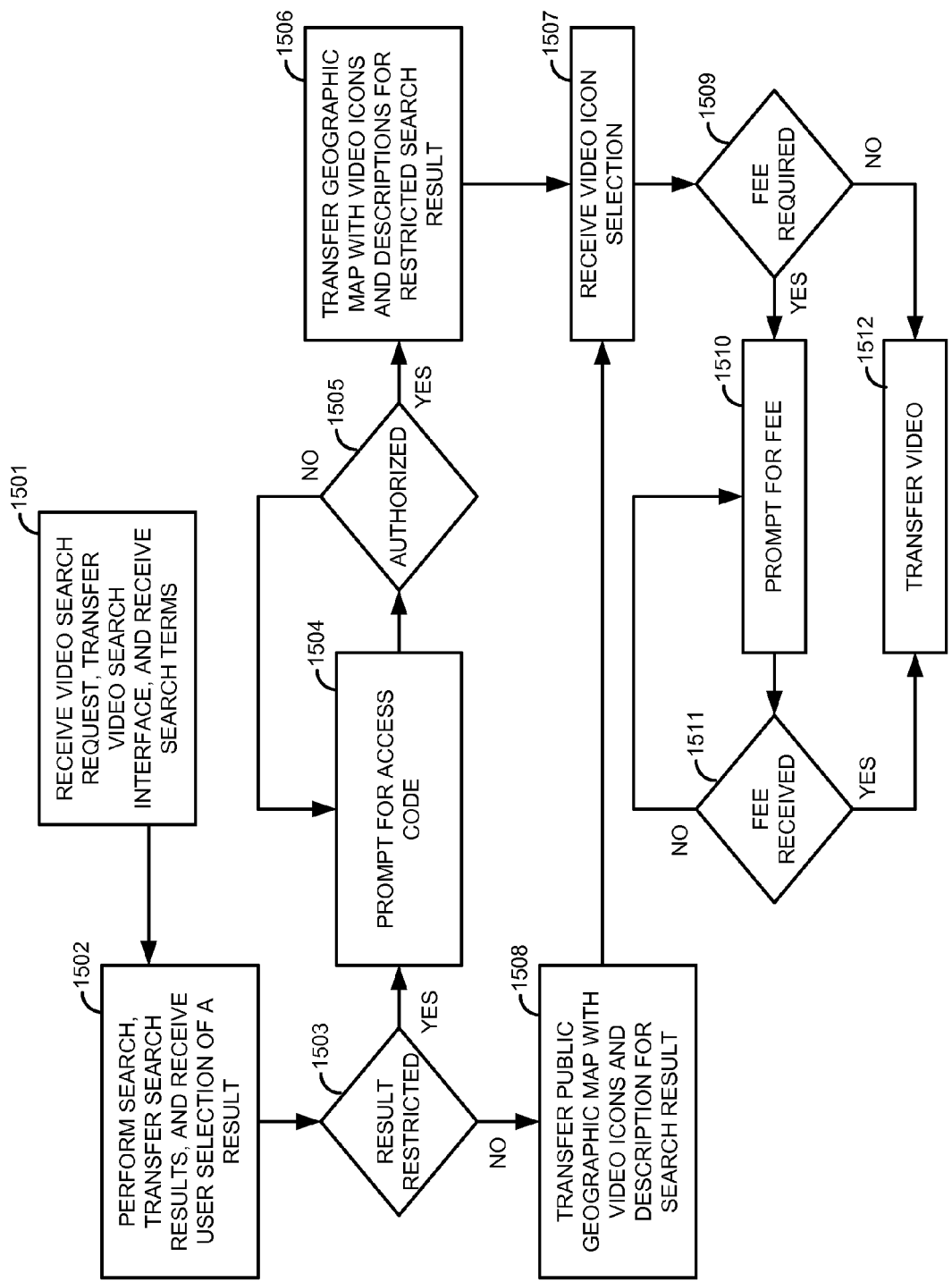
FIG. 15 illustrates the operation of the video server system.

FIG. 15 illustrates the operation of video server system 1200 to serve video requests. Video server system 1200 receives a video search request and responds by transferring a video search interface (1501). The search request could be represented by a special URL request or could be a menu option or selection button provided on another URL page. The search interface may include text boxes, maps, calendars, clocks, suggestions, and the like for the video requester to input search criteria. Video server system 1200 performs the search, transfers search results, and receives a user selection of a search result (1502). The search results could be a set of video icons and video data that relate to the search criteria. For example, if the search criteria is "Westside basketball" then the top three search results might be entitled: Westside High School 2015 Varsity Girls Basketball, Westside High School 2015 Varsity Boys Basketball, and Westside High School Varsity Basketball Archive.

Video server system 1200 determines if the selected search result is restricted (1502). If the selected search result is restricted (1503), then video server system 1200 prompts the requester for an access code, pool ID, and the like—including combinations thereof (1504). For example, if the selected search result is "John Doe Family Vacations", then restricted access may be implemented. Video server system 1200 processes the requester's authorization response (access code) to determine if the requester is authorized (1505). If the requester is authorized (1505), then video server system 1200 transfers the associated restricted geographic map with video icons and video data (1506). For example, server system 1200 may return a restricted map with icons at various vacation locales for the John Doe family. If the search result is not restricted (1503), then video server system 1200 transfers the public geographic map with video icons and video data (1508) identified by the selected result. For example, server system 1200 may return a public map with icons at various game locales for the Westside high school basketball teams.

Video server system 1200 receives an icon selection for a video (1507) and determines if any access fee is required for the video (1509). If a fee is required, video server system 1200 prompts the video requester for the fee (1510). If the fee is received (1511), video server system 1200 transfers the video to the video requester (1512). If no fee is required (1509), video server system 1200 transfers the video to the video requester (1512) responsive to the icon selection (1507).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access system to provide a wireless video service, the method comprising:
   in a base station, wirelessly broadcasting a pilot signal including a base station identifier and a network access provider identifier that identifies the wireless video service and, in response to the pilot signal, wirelessly receiving a wireless video uplink request for upload of at least displayable video data from a wireless video device;
   in a control system, processing reservation data for the base station to determine if the base station has excess capacity and if the wireless video device has a current wireless video uplink reservation, directing the base station to provide a wireless video uplink to the wireless video device for upload of at least the displayable video data into a video data server system if the wireless video device has the current wireless video uplink reservation, and indicating to add the base station identifier and the network access provider identifier to preferred roaming lists in other wireless devices; and
   in the base station, wirelessly receiving at least the displayable video data from the wireless video device over the wireless video uplink as directed by the control system.

2. The method of claim 1 further comprising, in the wireless video device, receiving a user input requesting the wireless video uplink, and in response, scanning a frequency band for the pilot signal having the network access provider identifier, and in response to detecting the network access provider identifier in the pilot signal, wirelessly transferring the wireless video uplink request to the base station.

3. The method of claim 1 further comprising in the control system, directing the base station to inhibit another wireless video uplink for another wireless video device if the wireless video device has the current wireless video uplink reservation.

4. The method of claim 1 further comprising in the control system, directing the base station to inhibit wireless data transfers for other wireless data devices if the wireless video device has the current wireless video uplink reservation.

5. The method of claim 1 further comprising in the control system, if the wireless video device does not have the current reservation, determining if the base station has capacity to provide the wireless video uplink to the wireless video device and directing the base station to provide the wireless video uplink to the wireless video device if the base station has the capacity.

6. The method of claim 5 wherein determining if the base station has the capacity comprises processing at least current wireless video uplinks and further comprising directing the base station to inhibit other wireless data uplinks if the base station device has the capacity.

7. The method of claim 1 further comprising:
   in the base station, wirelessly receiving a wireless data transfer request from another wireless communication device; and
   in the control system, processing at least the reservation data to determine if the base station has capacity to service the wireless data transfer request and directing the base station to service the wireless data transfer request if the base station has the capacity.

8. The method of claim 7 further comprising in the base station, wirelessly receiving data from the other wireless video device as directed by the control system.

9. The method of claim 1 further comprising in the control system, determining that the base station does not have the excess capacity and transferring a second message to remove the base station identifier and the network access provider identifier from the preferred roaming lists in the other wireless devices.

10. A wireless access system to provide a wireless video service comprising:
    a base station configured to wirelessly broadcast a pilot signal including a base station identifier and a network access provider identifier that identifies the wireless video service and, in response to the pilot signal, wirelessly receive a wireless video uplink request for upload of at least displayable video data from a wireless video device;
    a control system configured to process reservation data for the base station to determine if the base station has excess capacity and if the wireless video device has a current wireless video uplink reservation, direct the base station to provide a wireless video uplink to the wireless video device for upload of at least the displayable video data into a video data server system if the wireless video device has the current wireless video uplink reservation, and indicate to add the base station identifier and the network access provider identifier to preferred roaming lists in other wireless devices;
    the base station configured to wirelessly receive at least the displayable video data from the wireless video device over the wireless video uplink as directed by the control system.

11. The wireless access system of claim 10 wherein the wireless video device is configured to receive a user input requesting the wireless video uplink, and in response, scan a frequency band for the pilot signal having the network access provider identifier, and in response to detecting the network access provider identifier in the pilot signal, to wirelessly transfer the wireless video uplink request to the base station.

12. The wireless access system of claim 10 wherein the control system is configured to direct the base station to inhibit another wireless video uplink for another wireless video device if the wireless video device has the current wireless video uplink reservation.

13. The wireless access system of claim 10 wherein the control system is configured to direct the base station to inhibit wireless data transfers for other wireless data devices if the wireless video device has the current wireless video uplink reservation.

14. The wireless access system of claim 10 wherein the control system is configured, if the wireless video device does not have the current reservation, to determine if the base station has capacity to provide the wireless video uplink to the wireless video device and direct the base station to provide the wireless video uplink to the wireless video device if the base station has the capacity.

15. The wireless access system of claim 14 wherein the control system is configured to process at least current wireless video uplinks to determine if the base station has the capacity and to direct the base station to inhibit other wireless data uplinks if the base station device has the capacity.

16. The wireless access system of claim 10 wherein:
    the base station is configured to wirelessly receive a wireless data transfer request from another wireless communication device; and
    the control system is configured to process at least the reservation data to determine if the base station has capacity to service the wireless data transfer request and to direct the base station to service the wireless data transfer request if the base station has the capacity.

17. The wireless access system of claim 16 wherein the base station is configured to wirelessly receive data from the other wireless video device as directed by the control system.

18. The wireless access system of claim 10 wherein the control system is configured to determine that the base station does not have the excess capacity and transfer a second message to remove the base station identifier and the network access provider identifier from the preferred roaming lists in the other wireless devices.

* * * * *